Figure 1:
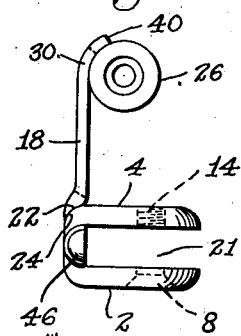

March 5, 1940.  F. A. STEVENS  2,192,208
OPHTHALMIC MOUNTING
Filed July 8, 1935  5 Sheets-Sheet 1

Inventor
Frederick A. Stevens
by David Rines
Attorney

March 5, 1940.    F. A. STEVENS    2,192,208
OPHTHALMIC MOUNTING
Filed July 8, 1935    5 Sheets-Sheet 2
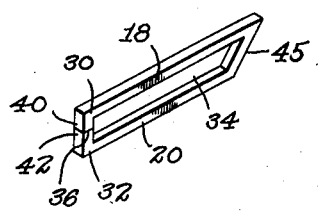
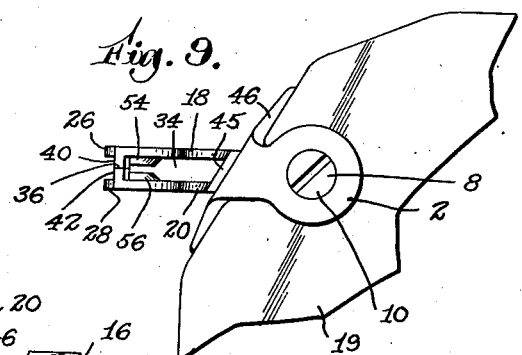
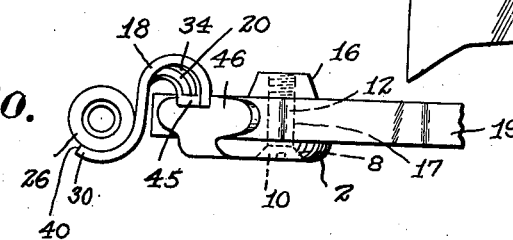
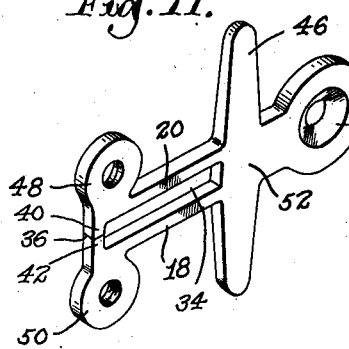
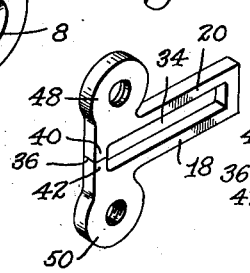
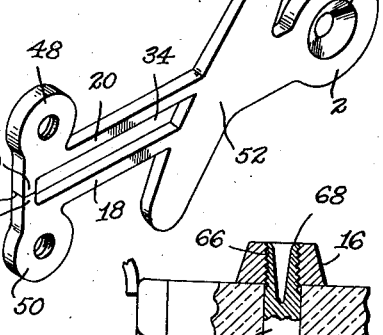
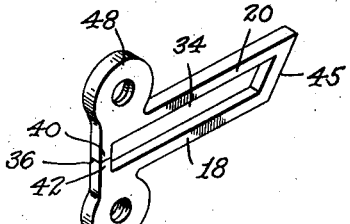
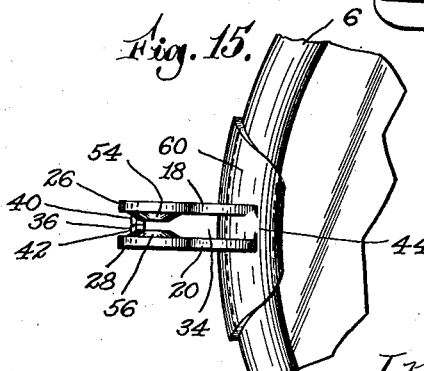
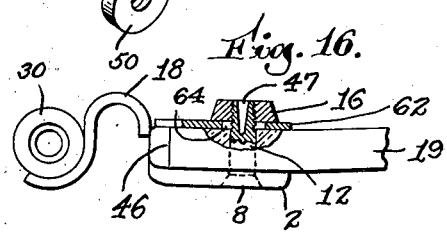
Inventor
Frederick A. Stevens
by David Rines
Attorney March 5, 1940.   F. A. STEVENS   2,192,208
OPHTHALMIC MOUNTING
Filed July 8, 1935   5 Sheets-Sheet 3
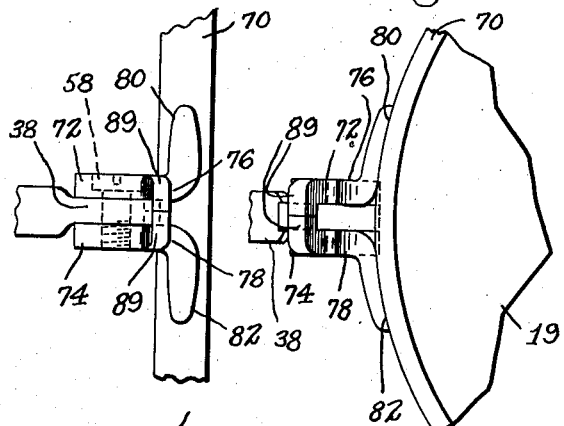
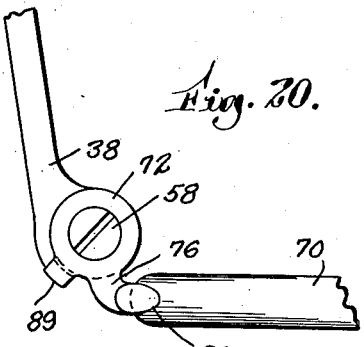
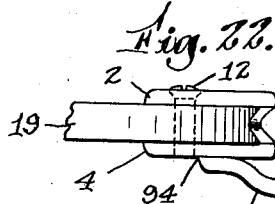
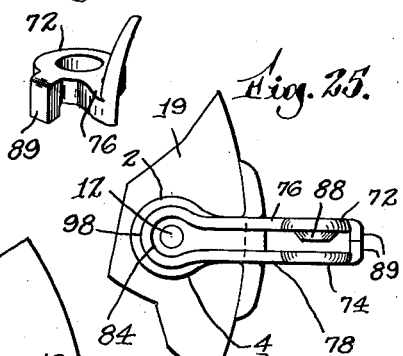
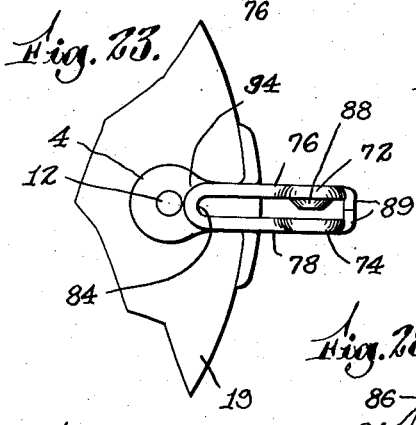
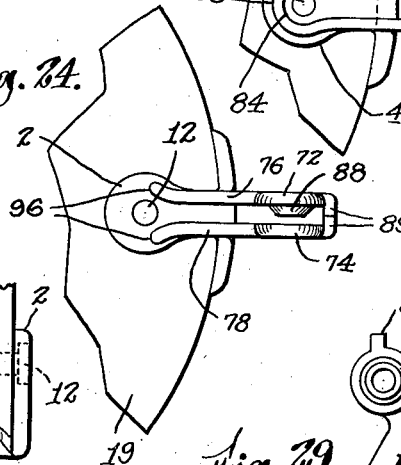
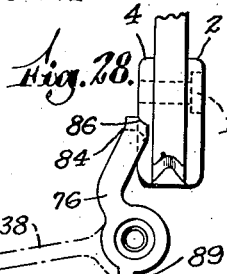
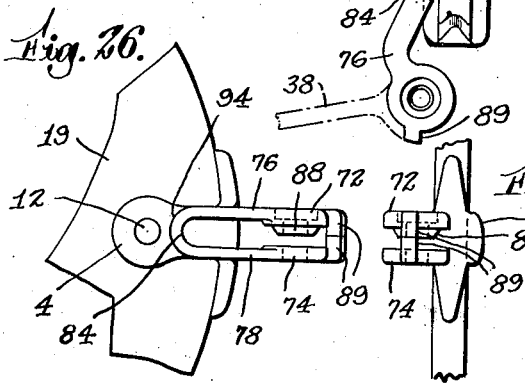
Inventor
Frederick A. Stevens
by David Renis
Attorney

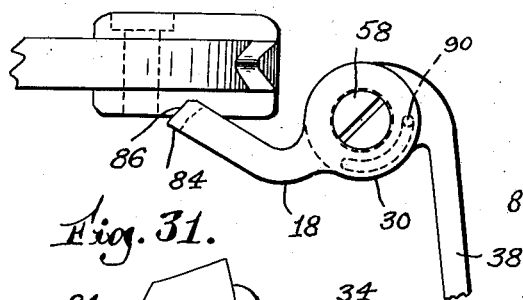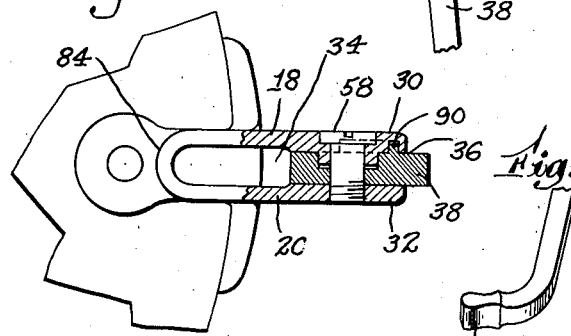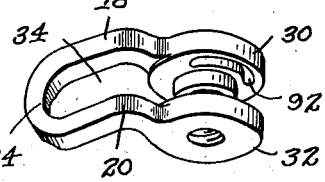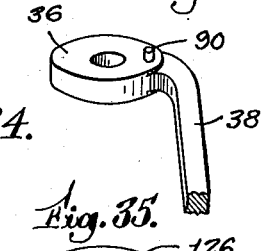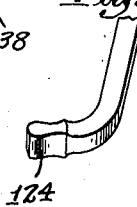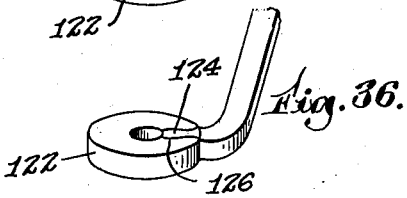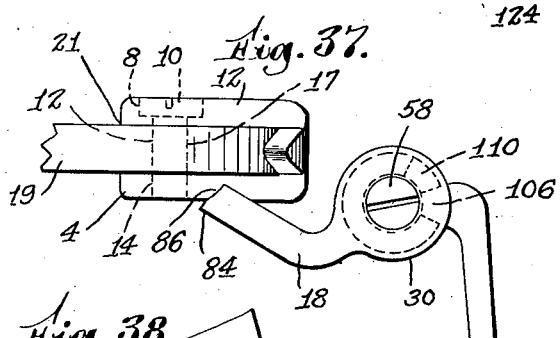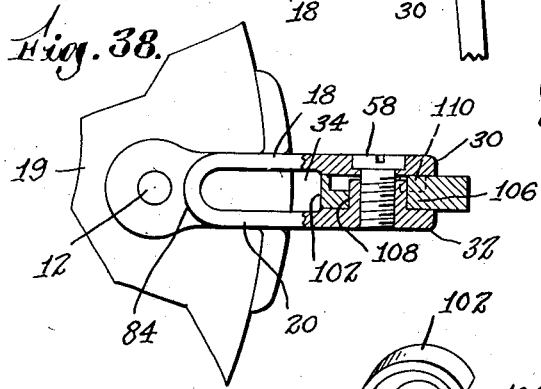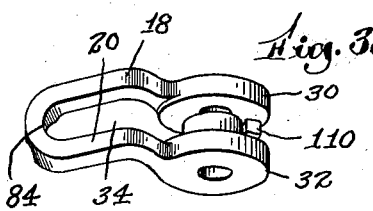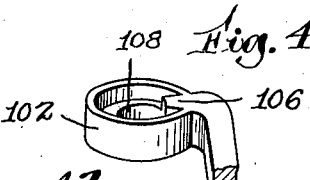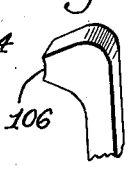

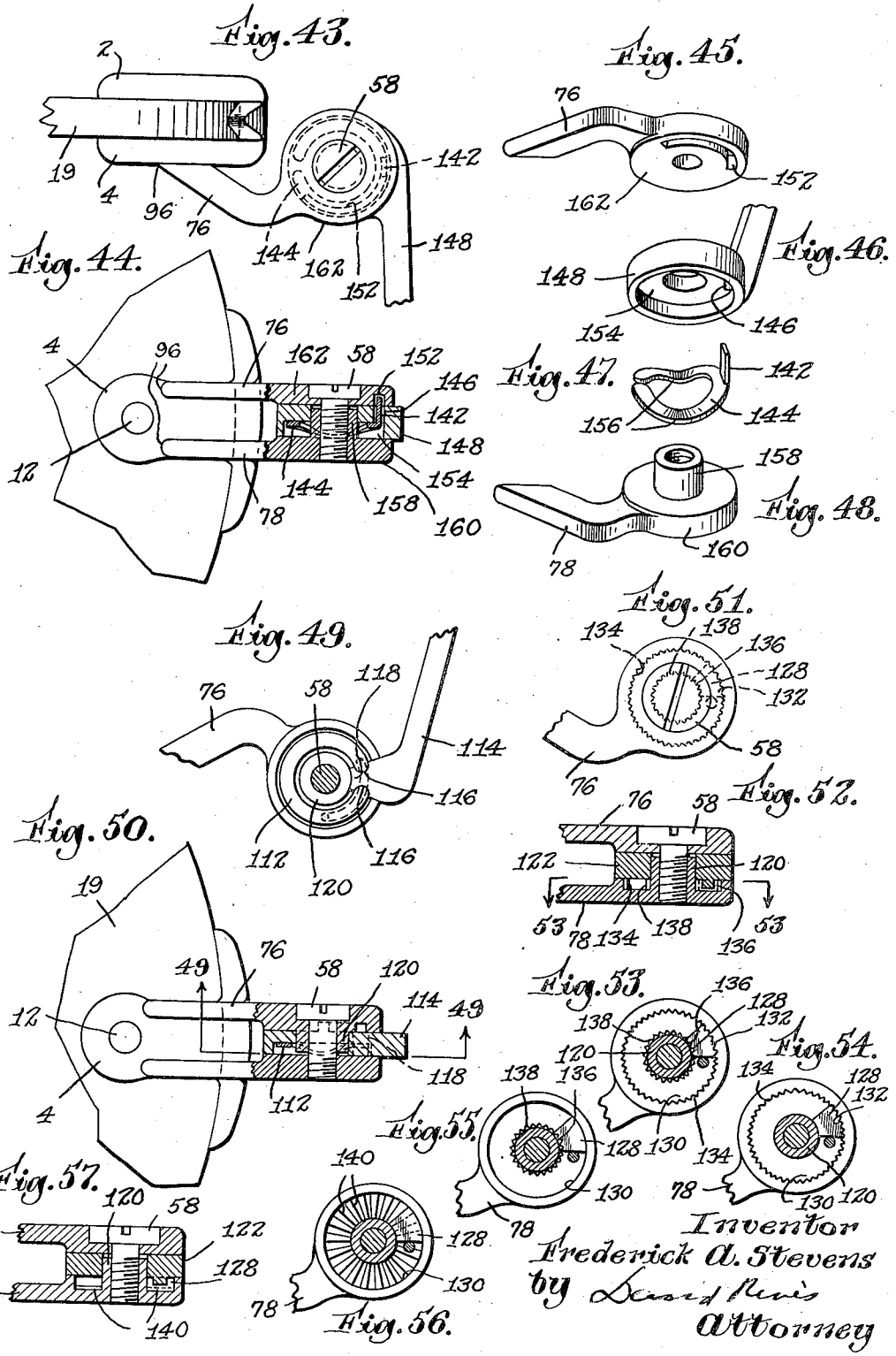

Patented Mar. 5, 1940

2,192,208

UNITED STATES PATENT OFFICE 2,192,208

OPHTHALMIC MOUNTING

Frederick A. Stevens, Providence, R. I.

Application July 8, 1935, Serial No. 30,359

6 Claims. (Cl. 88—53)

The present invention relates to ophthalmic mountings.

The temples of ophthalmic mountings are usually connected to lens-holding members by means of temple end pieces that are rigidly secured thereto. It is frequently necessary to adjust the angle at which the temples meet the lens-holding frame. To effect this result, it is necessary to twist the temple end pieces with respect to the lens-holding frame. This is usually accomplished by holding the lens-holding member in a pair of pliers and the temple end pieces in another pair of pliers, and twisting the pairs of pliers relatively to each other. This places an undue strain upon the end-piece connections and often leaves plier-mark scars upon the mountings, sometimes, indeed, resulting in destruction of the end pieces. It is, of course, possible to solder the end pieces at the proper angle to start with, but they must still be adjusted if, for any reason, an angular change should later be found to be desirable. The only alternative is for the optician to carry in stock a very large variety of differently angled end pieces. Even then, it frequently happens that the same individual needs a different angle for each temple and the difference is so slight that the regular stock angles will not serve to correct the discrepancy.

It is accordingly an object of the present invention to provide a new and improved end piece that shall be readily and easily adjustable to any desired position, angular or otherwise.

A further object is to obtain a complete reversal of conditions that maintain in the making and use of the ophthalmic end pieces now generally used, according to which it is the general practice to bend the outer ends of the sawed end pieces towards each other in order that, when the temple is inserted and the screw is tightened, there shall be a more or less tight engagement between the temple and the extreme outer portions or points of the end pieces.

The theory according to this prior art is that the bent end pieces will exert a spring pressure against the temple. In practice, it does not work to advantage. The extreme outer portions or points of the end-piece soon wear away and the temple is then quite out of frictional control.

According to a feature of the present invention, there are provided arms leading to the temple-holding ends, which arms do not contact and, consequently, there is nothing to prevent a perfectly parallel bearing between the ends and the temple at all times. There is thus achieved a long wearing, smooth turning contact, impossible to get by the methods now in common use.

Furthermore, if, after long use, sufficient wear takes place to loosen the temple, it is an instantaneous operation to tighten and relock the temple-holding screw; and, in so doing, there is no tendency to destroy the perfect alignment of the bearing surfaces. This is a condition impossible to obtain with the heavy, close contacting body portions of the temple ends employed at the present time.

Ophthalmic mountings of the rimless type have usually assumed either of two forms, the form with two ears between which the lens is disposed, and the form with but a single ear. In the two-ear mountings, the lens is held in place by a screw that extends through a perforation in one ear and is threaded into a threaded opening in the other ear. This construction introduces difficulties when the lenses have susbtantial surface curves, because the perforation and the threaded opening are thrown out of alignment by the adjustment of the ears to conform to the shape of the lens. The single-ear mounting is naturally free of this difficulty, but the lens is not supported on the side opposite the single ear, except by a small nut that is threaded on the screw, and this nut, furthermore, introduces a strain that tends to fracture the lens. According to the present invention, however, the two ears are retained, but the threaded opening is replaced by an unthreaded perforation of greater diameter than the diameter of the screw. The screw thus passes easily through both ears, and is held in place by a nut engaging the ear with the enlarged perforation. To eliminate the clumsiness of the resulting structure, the ear with the enlarged perforation is made very thin and flexible. The flexibility enables easy adjustment to any shape of lens; and, because of the thinness, the nut takes up susbtantially no more room than in the single-ear constructions.

When employing nuts, it is necessary to file off the protruding end of the screw, for appearance sake. This often results in filing away the gold coating of the nut.

According to a further feature of the present invention, therefore, a tubular member of soft metal may replace the screw, the metal being swaged in between the threads of the nut.

A further object is to provide a novel, internal stop for a temple.

Figure 2:
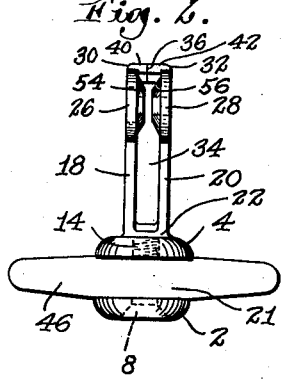
Figure 3:
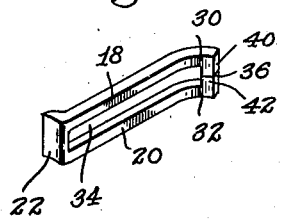
Figure 4:
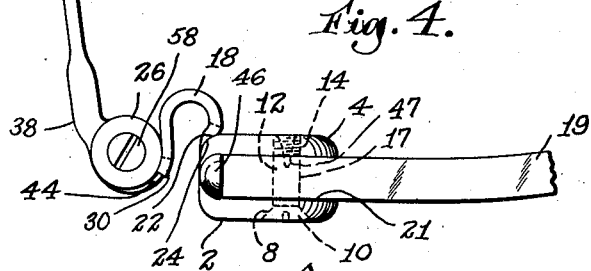
Figure 7:
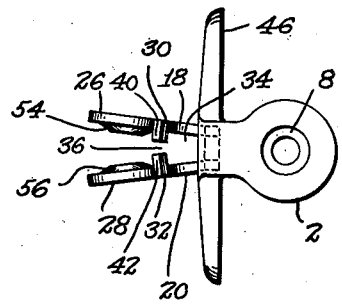
Figure 5:
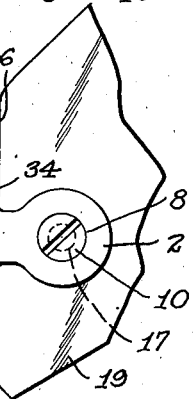
Figure 6:
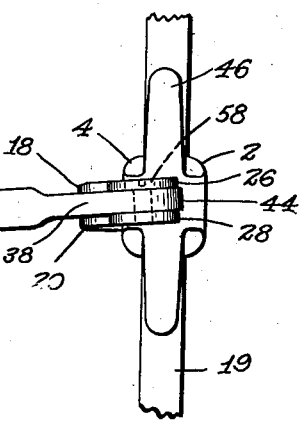

Other and further objects of the invention will be explained in connection with the accompanying drawings, in which Fig. 1 is a plan of a lens-holding clamp having secured thereto an adjustable end piece embodying the present invention; Fig. 2 is a corresponding end elevation; Fig. 3 is a perspective of a blank from which the adjustable end piece shown in Figs. 1 and 2 may be manufactured; Fig. 4 is a fragmentary plan corresponding to Fig. 1 of a frameless-lens ophthalmic mounting embodying the present invention; Figs. 5 and 6 are corresponding front and end elevations; Fig. 7 is a view corresponding to Fig. 5 of the lens-holding clamp, with the temple end pieces sprung apart prior to receiving the temple therebetween; Fig. 8 is a perspective similar to Fig. 3 of a modified blank; Fig. 9 is a front elevation corresponding to Fig. 7, embodying the modified blank of Fig. 8, with a single-ear, lens-holding clamp, and with the temple end pieces in normal position; Fig. 10 is a corresponding plan; Figs. 11 to 14 are perspectives of modified blanks; Fig. 15 is a front elevation corresponding to Fig. 9 of a modification embodying a celluloid or other lens-holding rim held by a clamp; Figs. 16 and 17 are plans partly in section, of further modifications; Fig. 18 is a fragmentary end elevation corresponding to Fig. 2 of a regular, all-metal frame having an adjustable end piece in accordance with the present invention; Fig. 19 is similarly a front elevation corresponding to Fig. 5 and Fig. 20 is similarly a plan view corresponding to Fig. 4 of the same; Fig. 21 is a perspective of one of the end pieces illustrated in Figs. 18 to 20; Figs. 22 and 23 are end and front elevations, respectively, of a modification; Figs. 24 to 26 are views similar to Fig. 23 of further modifications; Figs. 27 and 28 are end and plan views of the modification shown in Fig. 26; Fig. 29 is a plan view of a blank for manufacturing the end piece shown in Figs. 26 to 28; Figs. 30 and 31 are views similar to Figs. 22 and 23 of a further modification, Fig. 31 being partly in section; Figs. 32 and 33 are perspectives of the end piece and the temple shown in Figs. 30 and 31; Figs. 34 and 35 are perspectives of temple parts out of which may be formed the temple shown in perspective in Fig. 36; Figs. 37 and 38 are views similar to Figs. 30 and 31 of a further modification; Figs. 39 and 40 are views similar to Figs. 32 and 33 of the end piece and temple shown in Figs. 37 and 38; Figs. 41 and 42 are perspectives of parts out of which the temple shown in Fig. 40 may be formed; Figs. 43 and 44 are views similar to Figs. 30 and 31 of a further modification; Figs. 45 to 48 are perspectives of parts shown in Figs. 43 and 44; Fig. 49 is a section taken upon the line 49—49 of Fig. 50; Fig. 50 is a view similar to Fig. 31 of a further modification; Figs. 51 and 52 are fragmentary views similar to Figs. 49 and 50 of another modification; Fig. 53 is a section taken upon the line 53—53 of Fig. 52, looking in the direction of the arrows; Figs. 54 to 56 are views similar to Fig. 53 of further modifications; and Fig. 57 is a section similar to the sectional portion of Fig. 50, showing another modification.

The lens-holding clamp illustrated in Figs. 1 to 7, inclusive, comprises two ears 2 and 4, though the invention is adaptable for use with mountings having only a single ear 2, as illustrated in Figs. 9 and 10, and also to other types of mountings, such as those involving a Celluloid or other non-metal lens-holding rim 6, illustrated in Fig. 15. A regular all-metal mounting embodying the invention is illustrated in Figs. 18 to 20.

The ear 2 is shown provided with a bevel-walled or countersunk perforation 8 for receiving the enlarged head 10 of a screw 12. The other end of the screw 12 may be threaded in a threaded opening 14 of the ear 4 of the double-eared mounting or, in the case of the single-eared mounting, in a nut 16. The screw 12, of course, passes through an opening 17 in a lens 19 that is received in the groove 21 between the ears 2 and 4 or the equivalent space at the inner surface of other lens-holding members. The threaded end of the screw 12 may be provided with a longitudinal aperture 47 the threaded walls of which may be swaged against the threads of the opening 14 to lock the screw 12 in place, as described, for example, in Letters Patent 2,036,550, issued April 7, 1936.

An arm is illustrated as flexible or bendable for purposes of adjustment and assembly. This arm is shown in Figs. 1 to 7, and particularly in Fig. 3, as constituted of a blank comprising two bendable, susbtantially parallel, relatively slender strips 18 and 20, connected together at one end by a seat 22 that is adapted to be soldered to the outer surface of the lens-holding clamp at 24.

The soldering may be effected at any desired position of the lens-holding member or strap, preferably at the side of the lens-holding strap, at or near the screw 12, as illustrated in Figs. 28, 30 and 43. This improves the appearance, as the arms lie closer to the lens-holding member.

Three different locations of the adjustable arm relative to the strap are illustrated in Figs. 22 to 25. In Figs. 22 and 23, the adjustable arm is soldered a little distance away from the screw-receiving opening, at 94. In Fig. 24, the two straps of the adjustable arm are soldered very nearly at the location of the screw-receiving opening, at 96. And in Fig. 25, the straps of the adjustable arm are soldered at a point beyond the screw-receiving opening, at 98, so as to surround the screw hole. In all cases the adjustable may be constituted of the said two relatively slender strips 18 and 20, as illustrated in Figs. 5 to 7. Temple-receiving and bearing end pieces 26 and 28 are soldered to the other ends 30 and 32, respectively, of the strips 18 and 20. The adjustable arm may be bent individually and as a unit into any desired position, as illustrated in Figs. 4 to 6, so as to bring the bearing end pieces 26 and 28, and the temple carried thereby, close to or further from the lens-holding member 4. The adjustable arm may be secured to a metal clip or clamp 60, as illustrated in Fig. 15, or to a rim 70, as illustrated in Figs. 18 to 20.

The blank shown in Fig. 3 may be constituted of suitable stock, blanked and died into the desired shape, with an opening 34 cut longitudinally therefrom, after which the ends 30 and 32 are separated from each other by being cut at 36, preferably after the seat 22 has been soldered at 24. After the end pieces 26 and 28 have been soldered to the parts 30 and 32, therefore, they may be separated, as shown in Fig. 7, to permit insertion of a temple 38. Such separation of the end pieces would not normally be effected until after the temple-carrying arm 18, 20 had been adjusted to the desired position adjacent to the outer surface of the lens-holding member, one of which positions is illustrated in Figs. 4 to 7. A great advantage of this construction, due to the relatively great length of the strips 18 and 20, is that the temple may readily be caused to assume any desired angular position merely by a bending operation, and even without the use of pliers, by means of the fingers. Because it is possible to adjust the strips 18 and 20 individually, it is possible always to have firm bearing contact of the temple end pieces 26 and 28 against the temple even after the temple has been angularly adjusted.

After the slot 34 has been cut in the arm 18, 20, and after the cut has been made at 36, the parts 30 and 32 will become provided with abutting ends 40 and 42. These will serve as a limiting abutment for engagement by a temple stop 44.

The present invention is as applicable to the use of the "high" end piece, illustrated in Fig. 9, as to the ordinary end piece of Figs. 4 to 7. All that is necessary is to modify the blank of Fig. 3 so that it shall become adapted to attachment at an angle to the lateral axis of the lenses; and this without lessening the facility or value of the above-described, angular adjustment of the temple. The soldering seat 22, which is shown in Fig. 3 substantially at right angles to the strips 18 and 20, is merely disposed at a properly acute angle, as shown at 45, Figs. 8, 9 and 14, such as to adapt it for suitable soldering attachment to the inclined lens seat 46, as illustrated in Fig. 9.

If desired, the end pieces, shown at 48 and 50, the strips 18 and 20, the lens seat 46, the soldering seat 52 and the lens ear 2 could be blanked out from a single sheet of stock, as illustrated in Fig. 11. This one-piece member may then be struck in suitable dies and bent into the desired form. If this blank is to be soldered to a lens rim, of course, the strap 46 and the ear 2 will be omitted, as illustrated in Fig. 12. If the blank of Fig. 11 is to be used for a "high" end piece, as in Fig. 9, the strap 46 will be disposed at an angle to the blank, as illustrated in Fig. 13. The blank corresponding to Fig. 12 for the "high" end piece is shown in Fig. 14.

A preferred form of blank for an adjustable arm, for use with a rimless mounting, is illustrated in Fig. 29. It is blanked out of a single piece of metal and struck in suitable dies, after which it is intermediately bent at 84 into U-shape, as illustrated in Figs. 26 and 27, and soldered to the lens-holding member in a recess 86. One of the end pieces may be provided with a cone or tubular bearing 88 extending toward the other end piece, about which a temple may be journaled; and the temple may be provided with a projection 90 adapted to enter into and ride in an arcuate groove 92 the end walls of which will engage the projection to constitute internal stops for the temple; the temple stop is thus arranged wholly within the area of the circular temple butt, so as to be completely concealed from view. The projection 90 and the groove 92 may, however, be omitted, if desired, and the temple stop may be arranged outside the end piece, as shown at 40, 42 of Fig. 7, and illustrated at 89 in Fig. 21.

The end pieces may be made in two pieces, instead of one, as illustrated in connection with the all-metal frame shown in Figs. 18, 19 and 20. The all-metal rim 70 will be split at the bridge, in accordance with prior-art practice, in order to permit insertion of the lens; for the temple side of the rim, to which the end pieces 72 and 74 are secured, is continuous. Each end piece has a bendable arm, shown respectively at 76, 78, and these arms are soldered above and below the center of the rim, respectively, at 80 and 82. In this modification, too, there may be provided the internal stop 90 and the tubular bearing 88 for the temple to obtain parallel, frictional contact between the temple and the end pieces. In other respects, the construction may be the same as illustrated in Figs. 26 to 29.

The end pieces shown in Figs. 1 to 10 and 15 are provided with cone bearings 54 and 56 for insertion in correspondingly shaped recesses of the temple, thereby providing a greater bearing surface for the temple, to help prevent its loosening. The cone may be straight or curved in cross section. The cone bearings are not, however, essential, as is clear from Figs. 11 to 14.

According to the present invention, therefore, there are provided two separate adjustable arms 18, 20 fastened integrally at 22 and 52 to a lens-holding member 2, 4 or 2, or to a member, such as the metal clamp 60, that is fastened to a lens-holding member such as a Celluloid or other lens-holding rim 6, Fig. 15, or a metal spectacle frame, as in Figs. 18 to 20. Each arm 18, 20 terminates in an enlarged portion 26, 28, 48 or 50 suited to carry and support a temple member 38 which is hinged between the said enlarged portions, and held in movable contact with them by means of a headed and threaded screw 58.

The said arms 18, 20 are of equal (Figs. 1 to 7, 11, 12 and 15) or unequal length and shape between the lens-holding member and the enlarged portions, depending upon the peripheral location desired for the said temple, and the angular disposition of the temple-holding ends of said arms. If a location above the longitudinal center line of the lens is desired, for example, the upper of the two bendable arms is longer than the lower, as shown in Figs. 8, 9, 13 and 14.

One of the distinct advantages of this temple-holding structure is the more even bearing contact between the temple and end pieces, and the ready adjustment for wear, without destroying the full parallel bearing of the contacting parts.

This unique feature is made possible by the relative volume of metal in the different parts of the adjustable arm and the end pieces. When the two sides of the same are brought together to clamp the temple, the binding action of the screw 58 forces them into exact alignment with the sides of the temple, because, the volume of metal in the end pieces being substantially greater than that in the adjustable arms 18, 20, the said sides retain their shape throughout, while the arms compensatingly bend to accommodate the adjustment.

As illustrated in Fig. 16, a relatively thin, flexible plate 62 is rigidly secured to the lens seat 46 at the side opposite the side that carries the perforated ear 2 and is provided with an opening 64, alined with the ear perforation 8, that is of larger diameter than the diameter of the screw 12. The flexibility of the thin plate 62 permits of adjustment to the curvatures of the lens 10, which is permitted by the enlarged opening 64.

According to the modification illustrated in Fig. 17, the screw 12 is replaced by a tubular member 66 of softer metal, this softer metal being swaged into the threads of the nut 16.

The novel temple of the present invention may comprise a round disk 102 (Figs. 37, 38, 40 and 41) that may be made from either wire or flat stock, swaged into the form of a shallow cup. After it is so formed, a notch 104 is cut in its side to receive the butt end 106 (Fig. 42) of a temple. The butt end 106 is then soldered to the walls of the notch 104, and the parts are then swaged in suitable dies to obtain accurate dimensions and temper.

The notch 104 may be of any suitable shape. It may extend from the periphery all the way to a central hole 108 in the disk 102, as shown in Fig. 41, or it may stop short of the hole 108 (not illustrated). The temple butt should, of course, be shaped to correspond.

The thickness of the temple portion 106 within the cup 102 is equal to the full thickness of the cup, as shown in Fig. 40, and forms one element of the stop. The other element of the stop is a lug 110 (Figs. 37 to 39) that projects from one of the inner faces of one of the end pieces towards the oppositely disposed, inner face of the other end piece.

According to a further modification, a split spring washer 112 (Figs. 49 and 50) is employed to provide a smoother wearing connection. It is fastened to the temple 114 (Fig. 49) by snapping its ends into recesses 116 in opposite sides of the butt end 118 of the temple, which can not, therefore, be used as a temple stop.

The same construction may be employed without the spring washer 112, as in Fig. 52. The journal bearing 120 for the temple may be used, and also the internal stops, but the temple disk 122 is not cup-shaped. The two temple parts may be soldered together, the temple butt 124 in the recess 126 of the disk 122 (Figs. 34 and 35). The temple part 124 is shaped like a figure 8 to correspond to a similar shape of the recess 126. The parts are then soldered together, and swaged to shape and hardened.

In Figs. 51 to 57, there is illustrated an adjustable temple stop. A block 128 may be moved to any desired location within the circle 130. One side of the block 128 may be provided with teeth or ribs 132 that cooperate with corresponding teeth or ribs 134 on one side of the end piece. The temple-holding screw, therefore, will hold the block securely in position. Additional teeth 136 may be provided on the other side of the block, and additional teeth 138 on the other side of the end piece, as shown in Figs. 53 and 55. The teeth may be replaced by serrations 140, illustrated in Figs. 56 and 57, on the bottom of the cavity in the end piece and on the bottom of the block 128. In this cavity will rest the temple stop, the journal for the temple and the movable block 128.

Figs. 45 to 48 illustrate a combination internal-stop- and spring-controlled, frictional contact for a temple joint. The temple stop 142 may be continuation of the spring washer 144, and passes through an opening 146 in the temple 148. When the parts are assembled, the stop 142 enters a cavity 152 in the end piece 162. If the stop 142 is omitted the same advantages will be obtained, with the omission of the stop feature. An independent stop may then be provided. The spring washer may be split or continuous. Among the advantages of the split shape are a greater flexional field; because, if it is depressed flatwise, until it fills the cavity 154, it will, upon further depression, flex edgewise, and thus retain its flexibility flatwise, straightening out the curve 156 in the spring.

When the temple stop 142 is omitted, the spring 144 may be made of slightly larger diameter than the diameter of the cavity 154. The spring 144 will then retain its position in the cavity 154 without other holding means. All that is necessary is slightly to flex the spring edgewise as it is pressed into the cavity; after it is seated, the natural outward pressure will hold the spring 144 in place.

The end piece 160 may be provided with a tubular, central extension 158 acting as a journal bearing for the temple. The extension 158 may be internally threaded, thus substantially increasing the number of threads for the end-piece screw. As a journal, it keeps the temple accurately located and from coming in contact with the screw.

The parts as described may be reversed without departing from the spirit of the invention. For instance, the end piece 160 could be recessed for the spring 144 and a stop could protrude from the end piece 162 and enter the channel 146 in the temple 148; or, the journal 158 could project from the face of the end piece 162 and serve as a journal for the temple; the projection 158 still remaining, but at a length that would not quite meet the other projection.

The internal stop and the cone or tubular bearing are important features of the present invention, but the invention is not limited thereto, as the adjustable feature and the parallel bearing are successful without them, especially by the assistance of the said apertured screw 12.

By reason of the location and the bendability of the connecting arms, the adjustments are performed, according to the present invention, with great ease and to all degrees necessary for practical use, even without the aid of pliers, and without danger of breakage of the lens, both for the optician who dispenses the mountings and for the wearer.

Other modifications will occud to persons skilled ain the art, and all such are considered to fall within the spirit and scope of the invention, as defined in the appended claims.

What is claimed is:

1. An ophthalmic mounting comprising a cup-shaped member having a bottom wall and a peripherally disposed side wall and provided with a centrally disposed bearing opening in the bottom wall spaced from the side wall, and a block adjustably but rigidly mounted in the hollow of the cup to constitute a temple stop.

2. An opthalmic mounting having, in combination, a lens-holding member, two strips each secured at one of its extremities only to the lens-holding member with the said extremities immovable with respect to each other, the strips being separated from each other throughout beyond the said extremities, oppositely disposed end pieces carried by the ends of the strips opposite to the said extremities, and a temple pivoted between the end pieces, the end pieces and the temple having cooperating, bearing surfaces, the strips being constituted of material that is bendable and that retains the shape into which it is bent and being sufficiently slender and thin and narrow but on the contrary sufficiently long so as to be individually and as a unit adjustable both bendably and angularly in substantially all directions to permit individual adjustment of the said bearing surfaces toward and from the lens-holding member without destroying the bearing contact of the end pieces and the temple throughout the said bearing surfaces.

3. An ophthalmic mounting having, in combination, a lens-holding member having a lens-receiving groove on its inner surface and having also an outer surface, two strips each secured at one of its extremities only to the lens-holding member near the lens-receiving groove with the said extremities immovable with respect to each other, the strips being separated from each other throughout beyond the said extremities, oppositely disposed end pieces carried by the ends of the strips opposite to the said extremities, and a temple pivoted between the end pieces, the end pieces and the temple having cooperating, bearing surfaces, the strips being constituted of material that is bendable and that retains the shape into which it is bent and being sufficiently slender and thin and narrow but on the contrary sufficiently long so as to be individually and as a unit adjustable both bendably and angularly in substantially all directions to permit individual adjustment of the said bearing surfaces toward and from the lens-holding member without destroying the bearing contact of the end pieces and the temple throughout the said bearing surfaces.

4. An ophthalmic mounting having, in combination, a lens-holding member having a screw-threaded opening, two strips each secured at one of its extremities only to the lens-holding member relatively near to the opening with the said extremities immovable with respect to each other, the strips being separated from each other throughout beyond the said extremities, oppositely disposed end pieces carried by the ends of the strips opposite to the said extremities, and a temple pivoted between the end pieces, the end pieces and the temple having cooperating, bearing surfaces, the strips being constituted of material that is bendable and that retains the shape into which it is bent and being sufficiently slender and thin and narrow but on the contrary sufficiently long so as to be individually and as a unit adjustable both bendably and angularly in substantially all directions to permit individual adjustment of the said bearing surfaces toward and from the lens-holding member without destroying the bearing contact of the end pieces and the temple throughout the said bearing surfaces.

5. An opthalmic mounting having, in combination, a lens-holding member having a non-split portion, two substantially parallel strips having a soldering seat at one extremity, the soldering seat being soldered to the lens-holding member with the said strips at opposite sides of the non-split portion, whereby the said strips are immovable with respect to each other at the said extremity, the strips being separated from each other throughout beyond the said extremity, oppositely disposed end pieces carried by the ends of the strips opposite to the said extremity, and a temple pivoted between the end pieces, the end pieces and the temple having cooperating, bearing surfaces, the strips being constituted of material that is bendable and that retains the shape into which it is bent and being sufficiently slender and thin and narrow but on the contrary sufficiently long so as to be individually and as a unit adjustable both bendably and angularly in substantially all directions to permit individual adjustment of the said bearing surfaces toward and from the lens-holding member without destroying the bearing contact of the end pieces and the temple throughout the said bearing surfaces.

6. An opthalmic mounting comprising a lens-holding member, oppositely disposed end pieces secured to the lens-holding member, one of the end pieces being cup-shaped and provided with a recess, a temple arm pivoted between the end pieces, a block separate from the temple arm and rigidly adjustably mounted in the hollow of the cup, and means carried by the temple arm and adapted to be engaged by the block to constitute a temple stop.

FREDERICK A. STEVENS.